Dec. 15, 1953  N. P. PETERSEN  2,662,327
COLLAPSIBLE DECOY
Filed June 6, 1949  2 Sheets-Sheet 1
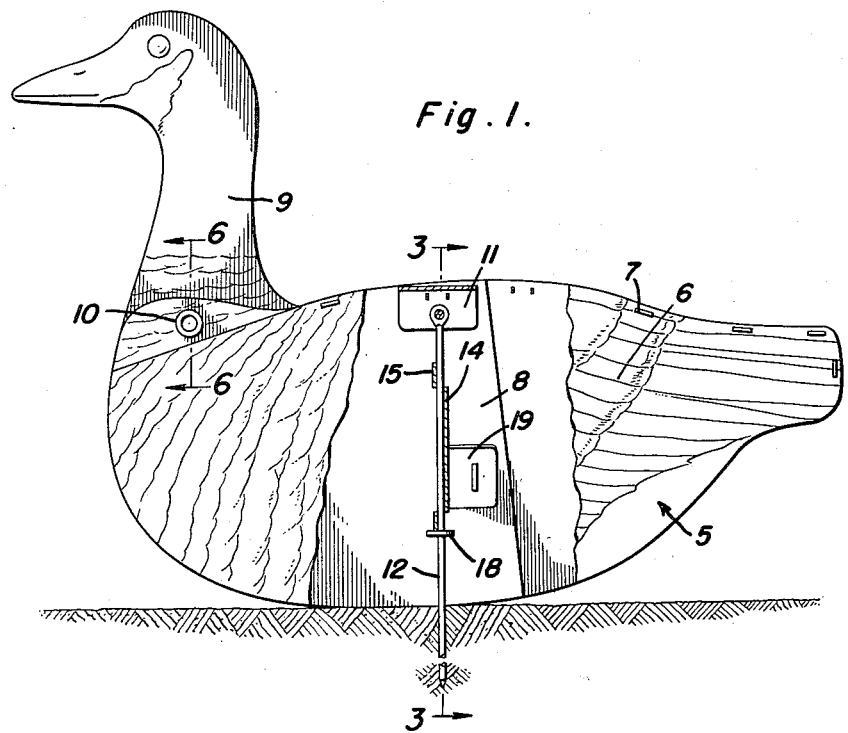
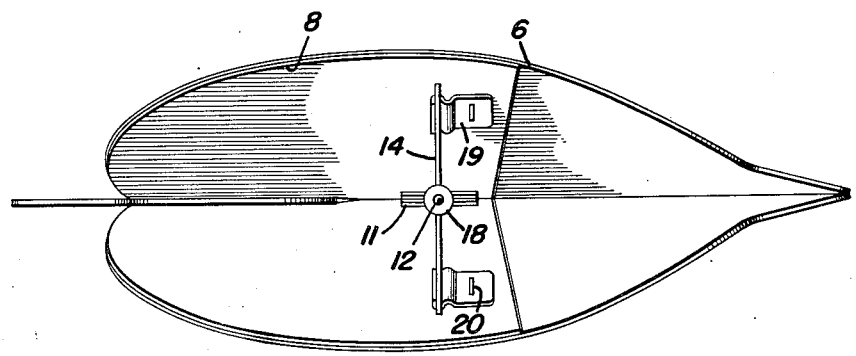
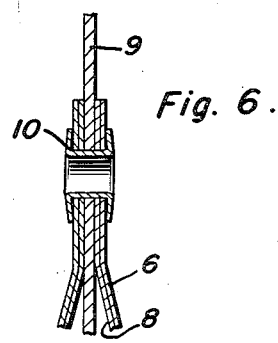
Inventor
Niels P. Petersen Dec. 15, 1953   N. P. PETERSEN   2,662,327
COLLAPSIBLE DECOY
Filed June 6, 1949   2 Sheets-Sheet 2
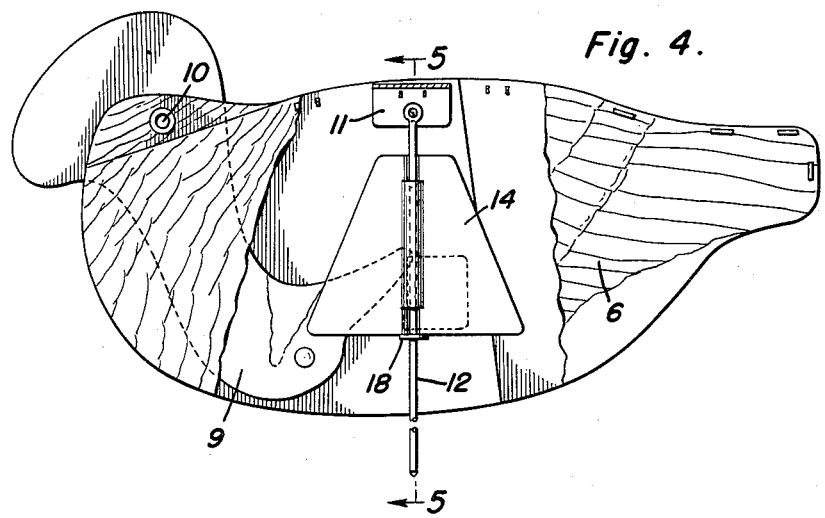
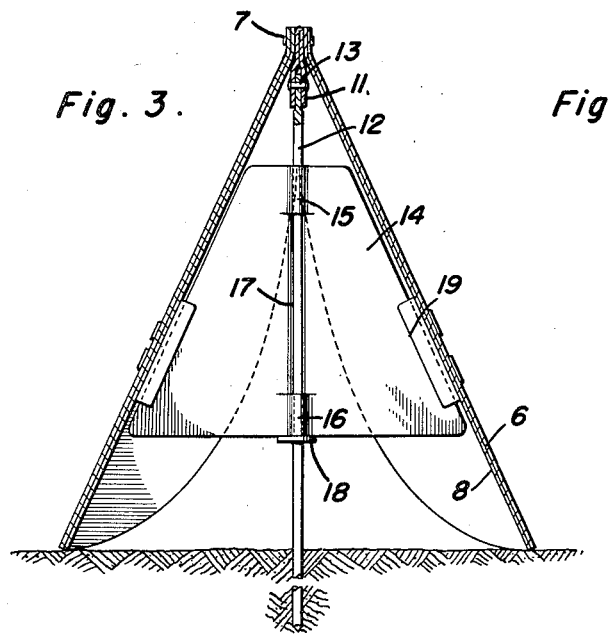
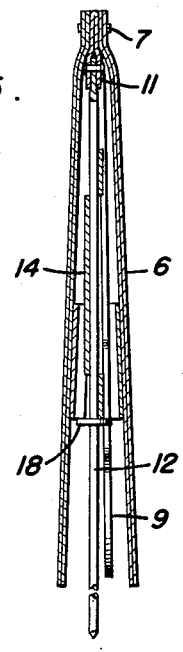
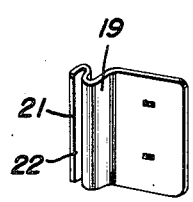
Inventor
Niels P. Petersen
By Clarence A. O'Brien
and Harvey B. Jacobson
Attorneys Patented Dec. 15, 1953

2,662,327

UNITED STATES PATENT OFFICE 2,662,327

COLLAPSIBLE DECOY

Niels P. Petersen, Provo, Utah

Application June 6, 1949, Serial No. 97,367

1 Claim. (Cl. 43—3)

The present invention relates to new and useful improvements in decoys, and more particularly to collapsible decoy geese.

An important object of the invention is to provide a decoy of this character constructed to provide a body having collapsible sides and providing a stake extending downwardly through the body for anchoring the decoy to the ground and also providing a spreader carried by the stake and movable into and out of position for holding the sides of the body in an open or outwardly spread-apart position.

Another object of the invention is to provide internal catches on the insides of the body to hold the spreader in open position.

A still further object is to provide a device of this character of simple and practical construction, which is strong and durable, efficient and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view showing the decoy in an open natural position and with parts broken away and shown in section;

Figure 2 is a bottom plan view;

Figure 3 is a transverse sectional view taken on the line 3—3 of Figure 1;

Figure 4 is a side elevational view showing the decoy in collapsed position;

Figure 5 is a transverse sectional view taken on the line 5—5 of Figure 4;

Figure 6 is an enlarged fragmentary sectional view taken on the line 6—6 of Figure 1 and showing the hollow rivet for the collapsible neck; and Figure 7 is an enlarged perspective view of one of the catches for the spreader.

Referring now to the drawings in detail wherein, for the purpose of illustration, I have disclosed a preferred embodiment of the invention, the numeral 5 designates generally the body of the decoy and which is composed of a pair of sides 6 of suitable sheet material shaped to represent the body of a goose, the upper edges of the sides being secured to each other by staples or the like 7 and the body being constructed of material sufficiently flexible to enable the sides of the body to swing inwardly and outwardly relative to each other into an open and closed position.

The forward portion of the sides 6 of the body are provided with a lining 8 of suitable sheet material to reinforce the sides 6.

A neck 9 also of suitable sheet material is pivoted at its lower end between the sides 6 at the front upper portion thereof by means of a hollow rivet 10, the neck being frictionally held between the sides 6 and swingable from its natural upright position, as shown in Figure 1 of the drawing, into a folded position downwardly between the sides as shown in Figure 4.

An inverted, U-shaped hanger 11, also constructed of suitable sheet material, is secured in position between the sides 6 at the upper portion thereof by one of the staples 7 and between which the upper end of a stake 12 is positioned and pivoted to the hanger by means of a pin 13, the stake extending downwardly between the sides of the body and below the lower edge thereof for embedding in the ground.

A spreader for the sides 6 is designated at 14 and is likewise constructed of suitable sheet material of substantially triangular shape, the central portion of the spreader being pressed or bent outwardly at opposite sides to form upper and lower eyes or bearings 15 and 16 at one side of the spreader, and an intermediate eye or bearing 17 at an opposite side of the spreader and in which the stake 12 is positioned for rotation of the spreader on the stake. The spreader is held in a raised position on the stake by means of a flange 18 carried by the stake and on which the spreader is supported to hold the same in position between the sides 6 of the body.

Each side 6 of the body is provided with an internal catch 19 secured to the sides of the body by staples or the like 20, the catch having a resilient free edge 21 shaped to provide a vertical channel 22 and in which the edges of the spreader 14 are received in a snapping action to hold the spreader in a transverse position with respect to the body to thus hold the sides 6 in an open position.

The sides of the body, as well as the neck and head, are suitably painted or decorated to simulate the feathers and other external features of a goose.

In the use of the invention, the neck 9 is swung into its raised position, as shown in Figure 1 of the drawing, and frictionally held by the rivet 10 and the sides 6 spread apart into an open position and the spreader 14 turned on the stake 12 to engage the edges of the spreader in the catches 19 to thus rigidly hold the sides 6 in their open position to rest on the ground when the stake 12 is forced into the ground.

The stake 12 will firmly anchor the body 5 of the decoy to the ground and support the same in its natural position.

To collapse the decoy, the edges of the spreader 14 may be disengaged from the catches 19 by relative swinging of the body and stake and the spreader 14 turned on stake 12 into a longitudinal position to release sides 6, which may then be folded closely against each other and neck 9 is swung downwardly between sides 6, as shown in Figure 4.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claim.

Having described the invention, what is claimed as new is:

A decoy comprising an elongated hollow collapsible body including flexible sides with longitudinal upper edges connected together for flexing of said sides into spread apart position, an inverted U-shaped hanger secured within the upper portion of said body, a stake extending downwardly out of said body between said sides for driving in the ground to anchor said body and having an upper end pivoted in said hanger adjacent said upper edges for swinging of the stake longitudinally of the body into the same when not in use, a spreader plate pivotally mounted on said stake for rotation thereon between said sides into crosswise position relative to said body with side edges opposed to said sides, and resilient catches on said sides inside the body engaging said side edges of the spreader plate with a snap action when the spreader plate is in crosswise position and coacting therewith to maintain said sides spread apart, said spreader plate being swingable by said stake lengthwise of said body after disengagement of the catches from said side edges and whereby said body may be collapsed.

NIELS P. PETERSEN.

References Cited in the file of this patent

UNITED STATES PATENTS

| Number | Name | Date |
|---|---|---|
| 311,877 | Danz | Feb. 10, 1885 |
| 364,573 | Brinkop | June 7, 1887 |
| 1,603,114 | Johnson | Oct. 12, 1926 |
| 2,011,480 | Gazalski et al. | Aug. 13, 1935 |
| 2,313,353 | Mills | Mar. 9, 1943 |
| 2,478,585 | Kouba | Aug. 9, 1949 |

FOREIGN PATENTS

| Number | Country | Date |
|---|---|---|
| 125,250 | Switzerland | Apr. 2, 1928 |